Sept. 1, 1936.   O. H. HANSEN   2,052,709
ART OF TREATING FOOD PRODUCTS
Filed May 4, 1932
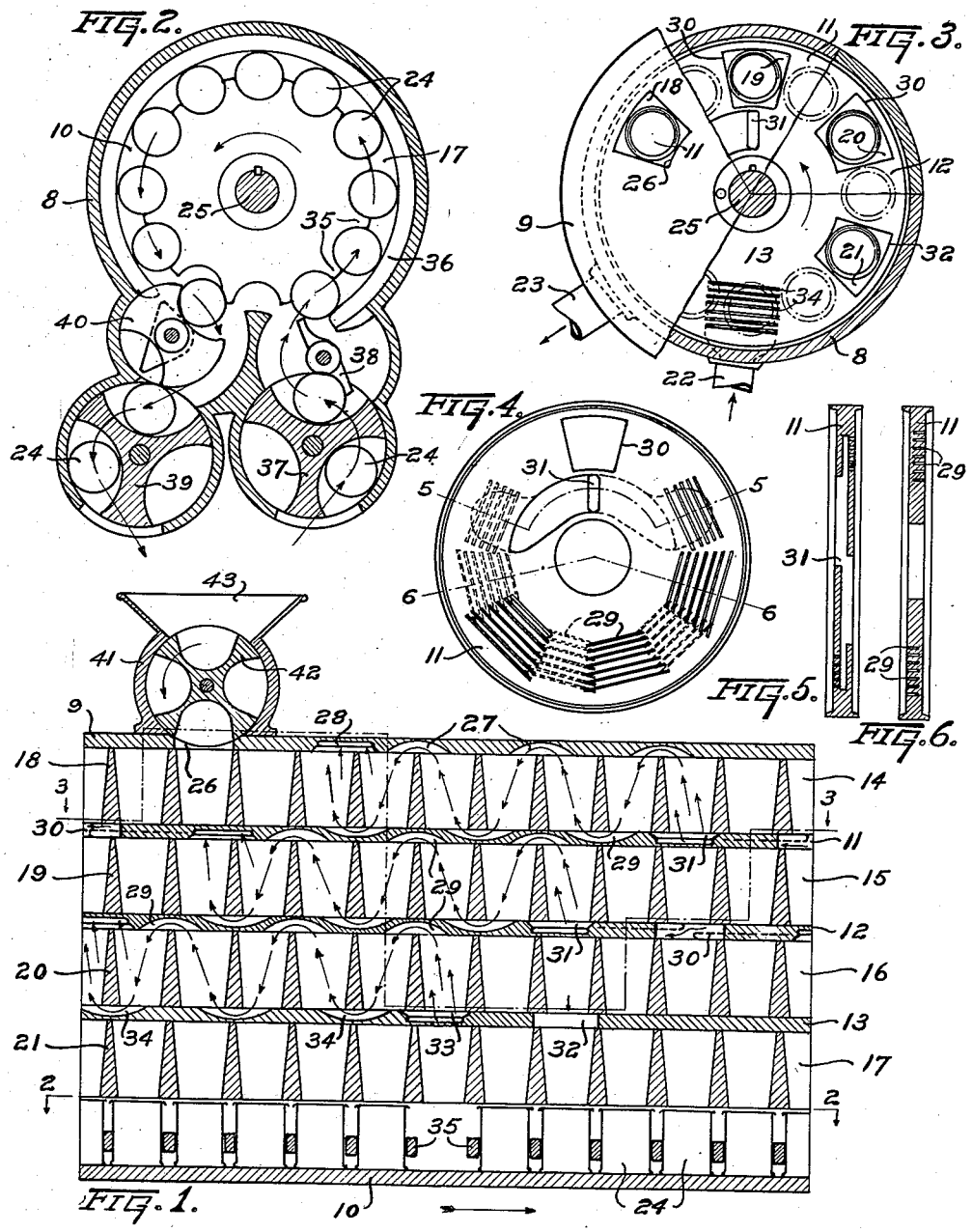
INVENTOR.
O. H. Hansen
BY
Morsell & Morsell
ATTORNEY.

Patented Sept. 1, 1936

2,052,709

UNITED STATES PATENT OFFICE

2,052,709

ART OF TREATING FOOD PRODUCTS

Oswald H. Hansen, Cedarburg, Wis.; William H. Lieber and John A. Thiel, executors of said Oswald H. Hansen, deceased, assignors to Hansen Canning Machinery Corporation, Cedarburg, Wis., a corporation of Wisconsin Application May 4, 1932, Serial No. 609,234

18 Claims. (Cl. 99—215)

The present invention relates in general to improvements in the art of treating food products in order to preserve the same, and relates more specifically to an improved process of and apparatus for sterilizing edible substances preparatory to packing batches thereof in sealed containers for the purpose of permitting subsequent transportation, handling and marketing.

Generally stated, an object of the present invention is to provide a new and useful process of effectively sterilizing food products, together with simple and efficient apparatus for carrying on the commercial exploitation of the process.

It has heretofore been proposed to sterilize edible substances in several ways, in order to preserve the same. The ordinary method which has been in vogue for many years, is to place batches of the commodity in containers such as tin cans, and to heat the food laden cans after sealing thereof. Due to the fact that it requires a relatively long heating period and relatively high temperature to penetrate and sterilize the center of each batch, this prior method is necessarily slow and also tends to deteriorate the outer portions of the batches, actually being destructive when used in the treatment of some materials. It has also been proposed to sterilize food products by subjecting batches thereof placed in the containers or cans, to direct contact with a heating medium such as steam admitted directly to the containers while open. The steam which was suddenly applied to the produce by this method, would produce rapid sterilization of solids, but would not penetrate the liquid at a sufficient rate of speed, and also tended to deteriorate the commodity due to sudden exposure thereof to extremely high temperature. In order to overcome these objections to the prior direct steam heating method, it has also been proposed to bring granular or solid foods into direct contact with a heating liquid at substantially atmospheric pressure. Due to this low pressure application of the liquid, it was impossible to transfer sufficient heat units to produce sterilization of some products, without heating the liquid sufficiently to convert the same into steam, so that a modification of the latter process resulted in the direct application of the heating liquid under pressure sufficient to prevent conversion thereof into steam. With this latest process of direct liquid heating under pressure, food products such as milk, fruit, vegetables and others, can be effectively sterilized in the shortest possible period of time, and while all of the above-mentioned prior methods of sterilizing by direct contact of the heating medium with the product, have considerable merit and a range of effective use, it has heretofore been impossible to efficiently apply the heating medium to all portions of the commodity so as to produce maximum output with minimum loss of heat and without deteriorating the material.

It is a more specific object of the present invention to provide an improved method of sterilizing foods or the like, by direct application of heating medium to the commodity, whereby the substance can be quickly and effectively heat treated without in any manner degrading the same.

Another specific object of the invention is to provide a new and useful process of directly applying heating medium to comestible substances or the like in order to preserve the same, in a manner to subject all portions of the commodity to gradually increasing and uniform heating so as to insure rapid and thorough sterilization of the entire mass of material.

A further specific object of the invention is to provide an improved sterilization method wherein the food product being treated may be maintained in motion and subjected to a counter-flow of heating medium such as steam or hot water.

Still another specific object of the invention is to provide a heat treating process wherein the substances treated are constantly advanced along a definite path and are subjected to a counter-flow of heating liquid at high temperature and subjected to pressure sufficient to prevent conversion of the liquid into steam.

Another specific object of the invention is to provide a method of sterilization especially applicable to batches of food products, which will enable effective sterilization, precooling and packing of the commodity under sterile conditions, and whereby either wet or vacuum packs may be produced.

A further specific object of the invention is to provide simple, compact and highly efficient apparatus for automatically carrying on the commercial exploitation of the improved methods above referred to.

Still another specific object of the invention is to provide improved sterilizing apparatus which is especially adapted to subject constantly advancing successive batches of food product to the direct heating action of a counter-flow of heating fluid under pressure, and which may be readily maintained in sanitary and effective operating condition.

These and other objects and advantages will be apparent from the following detailed description.

The present application is a continuation in part, of Patent No. 1,857,450, granted May 10, 1932, wherein is shown an apparatus comprising means for gradually subjecting food product to pressure, means for heating a liquid and for mixing the heated liquid with the food product while under pressure, and means for packing batches of the resultant sterilized food product in sealed containers.

A clear conception of the steps constituting the present improved method, and of the construction and mode of operation of one form of sterilizing apparatus adapted to commercially exploit the method, may be had by referring to the drawing accompanying and forming a part of this specification in which like reference characters designate the same or similar parts in the various views:

Fig. 1 is a somewhat diagrammatic development or circular section through an improved counterflow sterilizing unit;

Fig. 2 is a transverse horizontal section through the sterilizing unit, taken on the line 2—2 of Fig. 1;

Fig. 3 is a transverse section through various portions of the sterilizing unit, the section being taken along the irregular line 3—3 of Fig. 1;

Fig. 4 is a direct top view of one of the fixed transverse partitions or division plates of the unit;

Fig. 5 is a vertical section through the division plate, the section being taken on the line 5—5 of Fig. 4; and Fig. 6 is another vertical section through the division plate, taken on the line 6—6 of Fig. 4.

Although the sterilizing unit specifically illustrated is especially adapted for the treatment of granular material with a heating liquid such as hot water or brine, while measured successive batches of the commodity are subjected to high pressure, it should be understood that this apparatus, with perhaps some slight modifications, is also capable of being used to effectively sterilize liquids such as milk, and may effect sterilization with the aid of other kinds of heating media such as steam. The specific showing and description of a single embodiment of the invention, should not therefore be accepted as an intent to thereby limit the scope of the present invention.

The improved sterilizing unit shown diagrammatically in the drawing, comprises in general a stationary main casing 8 having removable top and bottom plates 9, 10 respectively, and forming a generally cylindrical enclosed heat treating space; a series of superimposed fixed circular partitions or division plates 11, 12, 13 which segregate the treating space into an upper chamber 14, an intermediate chamber 15, a lower chamber 16 and a discharge chamber 17; a series of superimposed pocket and funnel forming elements 18, 19, 20, 21 revolvable simultaneously about a common vertical axis within the chambers 14, 15, 16, 17 respectively; means for measuring and for admitting the commodity to be treated to the casing 8; inlet and overflow pipes 22, 23 respectively, for delivering the heating liquid to and from the casing 8; and mechanism for delivering the successive cans 24, to, through and from the discharge chamber 17.

The main casing 8 may be formed of a series of vertically removable annular sections in order to permit convenient manufacture, assembly and dismantling of the unit, and the rotary elements 18, 19, 20, 21 may be formed as similar disks secured to and rotatable by the main vertical drive shaft 25 and each having an annular series of downwardly tapering holes therein forming the pockets and funnels. These pockets and funnels are movable toward the right as viewed in Fig. 1, and counter-clockwise as viewed in Fig. 3, and the elements 18, 19, 20 substantially fill the chambers 14, 15, 16 respectively, and have snug sliding engagement with the plates above and below the same.

The cover or top plate 9 is provided with a product inlet opening 26 which is downwardly communicable with the upper ends of the successive pockets in the upper element 18, and the plate 9 also has a series of properly spaced by-pass passages 27 and an outlet duct 28, the latter of which communicates directly with the outlet or heating liquid overflow pipe 23. The partition plates 11, 12 are of similar construction as shown in detail in Figs. 4, 5 and 6, having similar but staggered by-pass passages 29 formed in the opposite sides thereof, and being provided with product discharge openings 30. Each of these partition plates 11, 12 is also provided with a heating liquid by-pass conduit 31 which communicates upwardly with one of the pockets of an upper element 18, 19 on one side of the opening 30 in the plate, and downwardly with a non-alined pocket of a lower element 19, 20 on the opposite side of the same opening 30, the construction of the conduits 31 being clearly illustrated in Figs. 4 and 5. The lower partition plate 13 is provided with a final product discharge opening 32 communicable directly with the upper ends of the successive funnel passages formed in the discharge element 21, and has a heating liquid inlet duct 33 which communicates directly with the inlet pipe 22. The upper portion of the plate 13 is also provided with by-pass passages 34 which are similar to the passages 27, 29 formed in the upper plates 9, 11, 12.

The casing bottom plate 10 provides a direct support for the cans 24, and a series of can hooks 35 mounted upon the main shaft 25 cooperate with a circular guide 36 as shown in Fig. 2, to urge the successive cans through the unit, while the open-topped cans are disposed directly beneath the successive funnels of the discharge element 21. A can inlet valve and transporting rotor 37 cooperates with the casing 8 and with a rotary transfer member 38 to introduce the successive empty cans 24 into the pressure space and between the can hooks 35, and these cans may either be sterilized prior to or after entering the sterilizing unit. A can discharge valve and transfer rotor 39 cooperates with the casing 8 and with a rotary transfer member 40 to deliver the successive food laden heat treated cans 24 from within the pressure space, and the cans 24 may be transferred from the member 40 or from the rotor 39 directly to a closing machine without exposure thereof to the atmosphere or other unsterile surroundings. It will be noted that the rotors 37, 39 hermetically seal the casing 8 at the can inlet and discharge openings so that the desired pressure conditions may be maintained within the heat treating chambers.

The means for measuring and for admitting the product which is to be heat treated and packed, to the sterilizing unit comprises a casing 41 having a measuring and feeding rotor 42 rotatable therein, and a supply hopper 43 communicable with the successive measuring pockets of the rotor 42. The rotor 42 is rotatable in a counter-clockwise direction as viewed in Fig. 1, and is adapted to deliver successive measured batches of the product through the opening 26 into the successive advancing pockets of the upper element 18. It will also be noted that the rotor 42 likewise seals the main casing 8 so that the desired pressure conditions may be maintained therein during ingress of the successive batches of product to be heat treated, and that the delivery portion of this rotor travels in the same direction as the element 18. The rotors 37, 39, 42 may all be driven from the main drive shaft 25, at predetermined speeds, and this also applies to the rotary members 38, 40.

During normal operation of the sterilizing unit in order to exploit the improved process, the interior of the casing 8 is under relatively high pressure, and the elements 18, 19, 20, 21 are being simultaneously rotated by the main shaft 25 which also drives the can hooks 35, members 38, 40 and rotors 37, 39, 42. The casing 8 and plates 9, 10, 11, 12 and 13 are tightly assembled so as to permit the establishment and maintenance of the desired high pressure within the chambers 14, 15, 16 and 17. The product which is being treated and subsequently packed in the successive cans 24, is measured into batches of equal volume by the rotor 42, and the measured batches are deposited through the opening 26 into the successive moving pockets of the upper revolving element 18. The element 18 carries the product along the upper plate 11 until the successive pockets reach the upper delivery opening 30 whereupon the batches of product drop from the upper chamber 14 into the complementary pockets of the revolving element 19 in the intermediate heating chamber 15. The element 19 then advances the product along the intermediate partition plate 12 until the successive pockets reach the lower delivery opening 30 of the plate 12, whereupon the batches of product fall by gravity into the complementary pockets of the lower advancing element 20. The element 20 then likewise advances the batches of product along the lower plate 13 until the delivery opening 32 is reached, whereupon the finally heat treated product gravitates through the successive funnels in the delivery plate 21 and into the open-topped cans 24 located beneath these funnels. The successive empty cans 24 are introduced into the lower chamber 17 by the rotor 37 and member 38, and after receiving their charges, the food laden cans are delivered by the can hooks 35 to the member 40 and rotor 39 in succession and are eventually discharged from the machine. It should be noted that except for the dropping of the product from one chamber to another, the substance being treated is constantly advanced about the axis of the shaft 25 in the same direction.

During the period in which the product is being thus transported through the machine and is dropping from one elevation to another, the chambers 14, 15, 16, 17 are subjected to pressure as previously indicated, and heating liquid is being constantly admitted at high temperature through the inlet pipe 22 and duct 33 to the successive approaching food laden pockets of the lower element 20. The heating medium thus admitted may have a temperature far above its boiling point, and is prevented from actually boiling and thus creating steam, by the high initial pressure within the casing 8. Upon entering the lower chamber 16, the heating liquid flows through the voids of the successive batches of the product, as clearly indicated by the arrows in Fig. 1, and the direction of flow of the sterilizing liquid is both opposite of and laterally back and forth across the path of travel of the batches undergoing treatment. In the lower heat treating chamber 16, the heating liquid flows from one batch of material to the other through the upper and lower by-pass passages 29, 34 of the plates 13, 12 until the transfer conduit 30 in the plate 12 is reached, whereupon the liquid passes upwardly into the intermediate heating chamber 15. In the intermediate heat treating chamber 15, the heating liquid again flows from one batch of product to the other through the upper and lower by-pass passages 29 of the plates 12, 11 until the transfer conduit 30 in the plate 11 is reached, whereupon the liquid passes upwardly into the upper heating chamber 14. In the upper heat treating chamber 14, the heating liquid likewise flows from one batch of material to the next through the upper and lower by-pass passages 29, 27 of the plates 11, 9 until the discharge duct 28 is reached, whereupon the spent heating medium is delivered to the outlet pipe 23 before reaching the inlet opening 26. The successive batches of the product are thus successively and gradually but quickly subjected to gradually increasing temperature, and the heating liquid is brought into direct contact with all particles of each batch so as to insure uniform and complete sterilization. The batches are subjected to the highest temperature just prior to delivery thereof to the cans 24, and are gradually subjected to increasing temperature as they advance through the machine from the inlet opening 26 in the plate 9 to the discharge opening 32 in the plate 13. After the finally sterilized batches are deposited in the cans 24, the heating liquid which is delivered from the last heating chamber 16 with each batch, may be evaporated to effect subsequent initial cooling, by merely establishing a reduced pressure in the lowermost chamber 17, and the cans 24 may be subsequently sealed and further cooled to produce a vacuum therein.

From the foregoing description, it will be apparent that with the improved sterilization method comprising the counterflow or movement of the product and heating medium, the commodity can be automatically, rapidly and effectively sterilized without danger of degrading the same as with the prior processes. The transfer conduits 30 enable effective delivery of the batches from one chamber 14, 15, 16, 17 to another without necessitating maintenance of all of these chambers at the same pressure. The by-pass passages 27, 29, 34 also permit obtaining of an effective cross-flow, and by properly controlling the flow of heating fluid and the speed of rotation of the shaft 25, the apparatus may be actuated to effectively heat treat the product with minimum loss of heat. The improved process and apparatus have been used to produce remarkable results when applied to various commodities which could not be effectively sterilized at a commercial rate of speed with the prior art methods, and is applicable with equal effectiveness for the treatment of fluid or solid foods.

It should be understood that it is not desired to limit the invention to the exact steps of the process and to the precise details of construction of the apparatus herein shown and described, for various modifications within the scope of the claims may occur to persons skilled in the art.

It is claimed and desired to secure by Letters Patent:

1. The process of sterilizing, which comprises, subjecting a mass of food product to progressively increasing pressure and to direct internal exposure of the mass with fluid of progressively increasing temperature and containing sufficient heat units to completely sterilize the product while causing the contacting portions of the product and fluid to constantly travel in different directions throughout the sterilizing period.

2. The process of sterilizing, which comprises, subjecting a moving mass of food product to progressively increasing pressure and to a counter-penetrating-flow of fluid having progressively increasing temperature and containing sufficient heat units to completely sterilize the product.

3. The process of sterilizing, which comprises, subjecting a mass of granular food product to progressively increasing pressure and to direct internal exposure of the mass with liquid of progressively increasing temperature and containing sufficient heat units to completely sterilize the granules while causing the contacting portions of the product and liquid to constantly travel in different directions throughout the sterilizing period.

4. The process of sterilizing, which comprises, subjecting a mass of granular food product to progressively increasing pressure and to direct penetration by a stream of liquid of progressively increasing temperature and containing sufficient heat units to completely sterilize the granules.

5. The process of sterilizing, which comprises, subjecting a moving mass of granular food product to progressively increasing pressure and to a counter-penetrating-flow of liquid having progressively increasing temperature and containing sufficient heat units to completely sterilize the granules.

6. The process of sterilizing, which comprises, subjecting each of a series of advancing batches of granular food product to progressively increasing pressure and to a counter-penetrating-flow of liquid passing in succession through the batches and having progressively increasing temperature and containing sufficient heat units to completely sterilize the granules of the successive batches.

7. The process of sterilizing, which comprises, subjecting a mass of food product to increasing pressure and to a series of successive penetrations by fluid flowing through the mass in a reverse direction during each succeeding penetration while subjecting the food product to progressively increasing heat sufficient to completely sterilize the mass.

8. The process of sterilizing, which comprises, subjecting a mass of food product to increasing pressure and to a series of penetrations by fluid flowing through the mass in a reverse direction during each succeeding penetration while progressively increasing the temperature of the food product sufficiently to completely sterilize the entire mass.

9. The process of sterilizing, which comprises, subjecting a mass of food product to progressively increasing pressure and to a series of penetrations by a continuous stream of fluid flowing through the mass in a reverse direction during each succeeding passage through the mass, the fluid having progressively increasing temperature and containing sufficient heat units to completely sterilize the food product.

10. The process of sterilizing, which comprises, subjecting constantly advancing successive segregated batches of food product to progressively varying pressure and to successive oppositely directed complete penetrations by fluid while simultaneously subjecting the food product to heat sufficient to completely sterilize the mass.

11. The process of sterilizing, which comprises, subjecting moving successive segregated batches of food product to progressively varying pressure and to successive complete penetrations in different directions by fluid containing sufficient heat units to completely sterilize the product.

12. In a sterilizer, means for moving a mass of food product, means for subjecting the moving mass to progressively varying pressure, and means for causing heated fluid to successively penetrate the mass in reverse directions.

13. In a sterilizer, means for transporting a mass of food product along a definite path while subjected to progressively varying pressure, and means for causing heated fluid to successively penetrate the advancing mass in reverse directions.

14. In a sterilizer, means for moving a mass of food product, means for subjecting the moving mass to progressively increasing pressure, and means for causing heated fluid to successively and completely penetrate the mass in opposite directions.

15. In a sterilizer, means for transporting a mass of food product along a definite path while subjected to progressively increasing pressure, and means for causing heated fluid to successively and completely penetrate the advancing mass in opposite directions.

16. In a sterilizer, means for transporting batches of food product along a definite path through zones of progressively increasing pressure, and means for causing heated fluid to successively directly completely penetrate the advancing batches in opposite directions.

17. In a sterilizer, mechanism for transporting segregated batches of food product along a definite path through zones of progressively increased pressure, and means for causing heated fluid to flow entirely through the successive advancing batches in reverse directions.

18. In a sterilizer, mechanism for moving independently confined and segregated batches of food product along a definite course through zones of progressively increased pressure, and means for causing sterilizing fluid to completely and successively peentrate each of the batches in reverse directions during advancement thereof along said course.

OSWALD H. HANSEN.